Dec. 1, 1925.                                                 1,563,377
C. H. KLEIN
PULLING AND TRANSPOSING MECHANISM FOR LINE WIRES
Filed Oct. 15, 1919
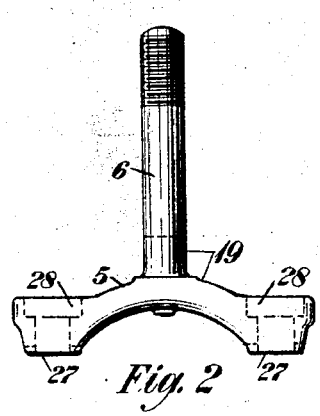
Fig. 2
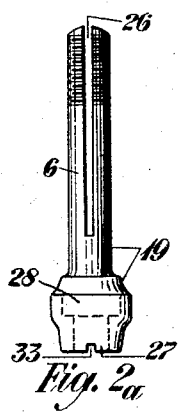
Fig. 2a
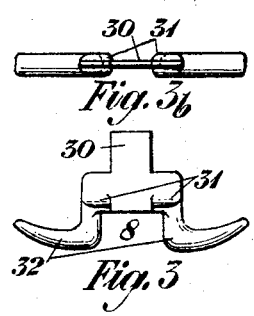
Fig. 3b
Fig. 3
Fig. 3a
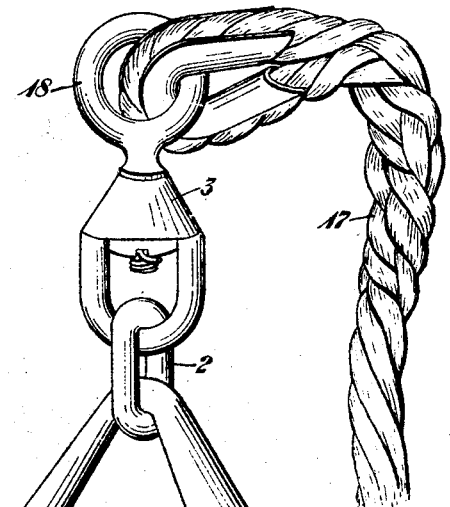
Fig. 1
Weight.
INVENTOR.
C. H. Klein
BY
G. E. Fok
ATTORNEY Patented Dec. 1, 1925.

1,563,377

UNITED STATES PATENT OFFICE.

CHARLES H. KLEIN, OF JERSEY CITY, NEW JERSEY, ASSIGNOR TO AMERICAN TELEPHONE AND TELEGRAPH COMPANY, A CORPORATION OF NEW YORK.

PULLING AND TRANSPOSING MECHANISM FOR LINE WIRES.

Application filed October 15, 1919. Serial No. 330,898.

*To all whom it may concern:*

Be it known that I, CHARLES H. KLEIN, residing at Jersey City, in the county of Hudson and State of New Jersey, have invented certain Improvements in Pulling and Transposing Mechanism for Line Wires, of which the following is a specification.

This invention relates to mechanism for installing transmission line wires and more particularly to a device for connecting a plurality of line wires to a pulling line and for facilitating the transposition of the said wires.

In placing transmission line wires and particularly those intended for telephonic or telegraphic use, it is customary to extend the pulling rope over the crossarm on each successive pole along the pole line on which the wires are to be placed. One end of each coil of wire to be placed is attached by means of a connecting device to one end of the said pulling line, and the pulling line is then drawn forward by horse power or automobile truck. In order that the wires may be properly identified at all stages of placing, they are attached to the said connecting device so as to occupy definite positions thereon and the connecting device is designed so that the wires may be transposed thereon without disconnecting them. Such a device is shown in Patent No. 1,265,851, which issued to Harry C. Williams on May 14, 1918. In the use of the mechanism shown in the said patent, difficulty may be experienced in transposing the wires of the pairs connected to the rotatable arms on account of the fact that when several pairs of long wires are being drawn into position an excessive force is required to lift the rotatable arms in order to transpose the wires. My invention provides means for facilitating the transposition of the line wires connected thereto, so that the said wires may be readily transposed while under tension. My invention embodies further improvements in line wires placing apparatus in that the transposing mechanism is shielded so that it will glide readily over the crossarms and also will be protected against mechanical injury from shocks or blows to which it may be subjected when in use; also by means of a more flexible rotatable connection between the pulling line and the yoke of the device, the difficulty that has been experienced heretofore due to the use of a rigid rotatable connection which resulted in excessive twisting of the pulling line has been avoided.

Other and further objects of this invention will be apparent from the following description when read in connection with the attached drawing, Figure 1 of which shows in perspective a view of the completed device having one end of the rotatable arm broken away in order to illustrate clearly the detail of assembly and of operation; Figures 2 and 2ª represent front and side views respectively of the rotatable arm and Figures 3, 3ª and 3ᵇ represent front, side and top views respectively of the trigger which constitutes the locking means of the rotatable arm.

In Figure 1 of the drawing, 1 indicates a yoke preferably made of steel, and having substantially the form shown which constitutes the supporting and protecting element of the device. Attached to the yoke by means of a link 2 is a swivel 3 equipped preferably with a ball-bearing and adapted to connect the pulling rope 17 to the yoke. Extending between the two sides of the yoke is a crossbar 4, the function of which is to afford a bearing for the support of the rotatable member 19. This rotatable member shown in detail in Figures 2 and 2ª comprises a crossarm 5 and a spindle 6 integral therewith, and it is adapted to be rotated within the supporting bearing of the crossarm 4 and held therein by means of a lock nut 7. The hole 27, having a recessed shoulder 28, is provided at each end of the crossarm 5 to form the supporting bearing for the rotatable double eye bolts 29 and 29'. The spindle 6 is provided with a slot 26 adapted to furnish a guiding support for a trigger 8 shown in detail in Figures 3, 3ª and 3ᵇ. The said trigger 8 comprises a central portion of uniform thickness somewhat less than the width of the slot 26 in which the trigger is adapted to move longitudinally. The trigger is prevented from moving laterally by means of the bosses 31 on each side of the central portion 30 which serve to guide the trigger when moving along the slot 26. The upper edge of the trigger on each side of the central portion has about the same thickness as the central portion and is adapted to engage a slot 9 in the lower surface of the supporting bearing. The trigger is also provided with hooks 32 disposed on either side to facilitate its withdrawal from the slot of the supporting bearing. A spring 10, coaxial with the spindle 6, is adapted to hold the trigger 8 normally within the slot 9, thereby preventing rotation of the arm. When the said trigger has been withdrawn from the slot, the spring maintains the trigger in contact with the underside of the supporting bearing so that the trigger will again be pressed into the slot after the arm has been rotated through 180 degrees and will thereby lock the arm in that position.

Rotatably supported by the arm 5 are eye bolts 29 and 29', each having a pair of eyes and a spindle which is adapted to rotate within the bearing portion of the said arm 5 and held in position by means of the lock nuts 11 and 11' respectively. The spindles 12 and 12' are slotted longitudinally in a manner similar to the spindle 6 of the rotatable member 19. Triggers 13 and 13' which are similar to trigger 8 are slidably mounted within the slots of the spindles 12 and 12' respectively, and are normally pressed against the underside of their respective bearing surfaces by means of the springs 14 and 14' which are coaxial with the spindles 12 and 12' respectively. Each bearing surface at the ends of the arm 5 is equipped with a slot 33 which is adapted to engage the triggers 13 and 13' when the eyes of the bolts are in the same plane as the yoke. A pair of eyes 25 are integrally connected with one side of the yoke and a knob 16 constituting the means for attaching a guide rope 15 to the yoke is integrally connected at the bottom of the opposite side of the yoke.

This invention will be more clearly understood from the following description of the manner in which the device is operated. Let it be assumed that a pulling rope 17 has been connected with the eye 18 of the swivel 3 and that a plurality of pairs of wires 20, 21 and 22 has been connected with the pairs of eyes 23, 24 and 25 respectively and that a guide rope 15 has been attached to the knob 16. If, in the course of placing the wires, it is desired, for example, to transpose the wires of pair 20, the trigger 13 is withdrawn from the slot 33 in the underside of the bearing support of arm 5 by placing a finger over each hook of the trigger and pulling in the direction of the wires until the compression of the spring 14 is overcome. When the trigger has been withdrawn from its corresponding slot, the eye bolt 29 may be rotated in the desired direction by turning the trigger or the eyes of the bolt in the desired direction. When the bolt has been rotated through 180 degrees so that the wires of the pair are in transposed position, the edge of the trigger 13 will be forced into the slot 33 in the underside of the crossarm 5 by the force of the spring 14. In a similar manner the wires of the pair 21 might also be transposed. It will be seen that the magnitude of the force necessary to unlock the transposing mechanism is dependent only upon the compressive force of the spring that is associated with the locking trigger and is entirely independent of the tension of the wires attached to the transposing mechanism. Heretofore when it was desired to transpose the wires of a pair, it has been necessary to slack off the pulling line in order to reduce the tension in the line wires so that the transposing mechanism could be unlocked and rotated. By means of this invention such procedure is rendered unnecessary since the line wires may be transposed while under the tension that normally exists in the said wires while being placed.

If it is desired to transpose pairs 20 and 21, which together constitute a phantom circuit, the trigger 8 may be withdrawn from the slot 9 in the undersurface of the bearing in which the spindle 6 rotates until the upper edge of the trigger is clear of the undersurface of the bearing. The rotatable member 19 may then be twisted in the desired direction through 180 degrees, when the pressure of the spring 10 will force the trigger 8 into the slot 9 and will lock the transposing mechanism in that position. Such rotation will result in a transposition not only of the pairs themselves but also of the wires of each pair. If, therefore, it is desired to transpose only the two pairs and not the wires of either pair, the eyebolts 29 and 29' may be twisted 180 degrees in the direction opposite to that in which the member 19 was twisted, thereby restoring the wires of each pair to their non-transposed positions and leaving the pairs themselves in transposed position. It is apparent, therefore, that as in the case of transposing the wires of a pair, it is unnecessary, in transposing the pairs of wires constituting a phantom group, to overcome the tension of the wires connected with the transposing mechanism. It is necessary only to overcome the compressive force of the spring 10 that holds the locking trigger normally within the slot 9 in the under portion of the bearing. In view of the ease with which such transpositions may be effected, the placing of the wires will therefore be facilitated and economy will be effected thereby.

It may be noticed that the wires of pair 22 which are customarily referred to as the pole-pin pair, are not attached to a rotatable eye bolt in the manner in which the other pairs of wires are attached, but are connected with a pair of eyes integral with one side of the yoke so that these wires may be transposed only by disconnecting each wire from its corresponding eye and transferring it to the adjacent eye. Since the crossarms commonly used in telephone construction are adapted to support ten wires, that is to say five wires on each side of the pole, one of the wires of this pole-pin pair which are attached to pins on opposite sides of the pole must necessarily be disconnected from the yoke at each pole and passed around the pole in order that the wire may occupy its proper position on the crossarm. In view of the necessity, therefore, for disconnecting one of the wires at each pole, there is, of course, no advantage in attaching them to a rotatable member such as 29 or 29', the function of which is to effect a transportation of the wires without disconnecting them.

Each wire of the pole pin pair 22 is attached to a separate eye in order that each wire may be identified at all stages of placing thereby avoiding the confusion which arose in the use of prior devices in which both wires were attached to the same eye.

In line wire placing devices heretofore used, the transposing mechanism has not been sufficiently protected against mechanical injury and accordingly it has been subjected to severe blows while being drawn over the crossarms which generally resulted in the bending or breaking of some of the parts of the transposing mechanism.

Furthermore, such lack of protection or shielding allows the projecting parts of the transposing mechanism to catch upon the pins or other outstanding parts of the crossarms over which this device is drawn in the process of wire placing. This results in injury to the device and delays in the work of placing the line wires and thereby reduces the efficiency of the operation. In the embodiment of the invention shown in Figure 1, the transposing mechanism has been placed within the V-shaped yoke, whereby the mechanism is protected while the yoke is being drawn between pins on the crossarms or over other objects along the line on which the wires are being placed, and freedom from delay due to entanglement is insured. It will be seen, therefore, that this invention provides a transposing mechanism that is protected against injury arising from shocks or blows in the course of its use, which in turn tends to assure freedom from delay and greater efficiency of operation.

Furthermore, in the devices heretofore used in which the pulling line is attached to the yoke by means of a swivel inserted therein, difficulty has been experienced when a sharp turn in the pole line on which the wires are being placed created an acute angle between the pulling line and the axis of rotation of the swivel. This often causes the swivel to bind, thereby preventing rotation and allowing the pulling line to twist. One of the objects of this invention is to prevent this difficulty. This is accomplished by connecting the swivel 3 to the yoke by means of a link 2 which increases the flexibility of the arrangement. It will be seen that the swivel is adapted to adjust itself to the various directions that the pulling line may assume and its axis will always coincide substantially with the axis of the pulling line. The swivel will therefore always function properly and the trouble heretofore experienced consisting of the twisting of the pulling line will be avoided.

A further object of this invention is to provide means tending to prevent the unintentional twisting of the line wires during the course of placing and to enable the wires to be readily untwisted in case such a twisting has occurred. It is well known that hard drawn wires will tend to twist when being installed on a pole line due to the fact that these wires are usually packed in the form of coils at the time of manufacture. It is desirable in the course of placing to know whether the group of wires have twisted about each other and if so to remove this unintentional twist. This invention provides such means consisting in a knob placed on the inner face of one of the sides of the yoke at the outer end of the said side and preferably integral with said side. Such knob is adapted for connecting a guide rope to the said yoke. To prevent twisting the wires, a weight 35 may be attached to the other end of the said rope which will keep the yoke in a vertical plane with that side of the yoke downward which has the knob attached thereto. If it is found undesirable to attach a weight to the said rope, it may be allowed to swing freely and if the wires tend to twist, the rope will wind around them. The rope will serve as an index of the amount of twisting and the wires may be restored to their correct position by pulling on the rope until it is fully unwound.

The device herein disclosed is adapted for the connection of three pairs of line wires since that is the maximum number that it is customary to place at one time by means of this device. It is, however, not desired to restrict the invention to the single form in which it is here shown, inasmuch as the apparatus embodying this invention may be designed for connecting a different number of pairs of wires and having different arrangements of the transposing mechanism herein disclosed.

While for the purpose of illustration the invention has been shown as embodied in a single form, it is to be understood that the invention is capable of other and widely different forms of embodiment which fall within the scope of the appended claims.

What is claimed is:

1. In an arrangement for transposably connecting a plurality of wires to a yoke connected with a pulling line, the combination with a pair of wires of means for attaching the said wires to a yoke, the said attaching means comprising a rotatable mechanism including a slotted spindle and spacing arms, whereby the wires of the pair may be transposed, and locking means consisting of a trigger guided by the slot in the said spindle and a spring co-operating with the said trigger whereby the said mechanism may be securely held in a fixed position.

2. In an arrangement for transposably connecting a plurality of wires to a yoke connected with a pulling line, the combination with a plurality of pairs of wires of means for attaching the said pairs to a yoke, the said means including a rotatable mechanism including a slotted spindle and spacing arms, whereby the pairs of wires may be transposed, and locking means consisting of a trigger guided by the slot in the said spindle and a spring co-operating with the said trigger, whereby the said mechanism may be securely held in a fixed position.

3. In an arrangement for transposably connecting a plurality of wires to a yoke connected with a pulling line, the combination with a plurality of pairs of wires of means for attaching the said wires to a yoke, the said means including a plurality of rotatable mechanisms each including a slotted spindle and spacing arms, whereby the adjacent pairs of wires and also the wires of the said pairs may be transposed, and locking means associated with each of said mechanisms consisting of a trigger guided by a slot in its respective spindle and a spring co-operating with the said trigger whereby the said mechanism may be held in a fixed position.

4. In a device for attaching a plurality of line wires to a pulling line, the combination with a framework adapted for connection with said pulling line of a transposing mechanism adapted for connection with a plurality of line wires, and means for supporting the said transposing mechanism within said framework so as to lie between two planes, passing through the upper edges and the lower edges respectively of the said framework whereby the said transposing mechanism is protected from injury during the placing of the said line wires.

5. In a device for attaching a plurality of line wires to a pulling line, the combination with a V-shaped yoke adapted for connection with the said pulling line of means for supporting within the said V-shaped enclosure a mechanism for connecting a plurality of line wires with the said yoke and for facilitating the transposition of the said wires, the said mechanism lying between two planes, one passing through the upper edges of the two sides of the V-shaped yoke and the other through the lower edges of the two sides of the said yoke, whereby the said mechanism is protected from injuries.

6. In a device for attaching a plurality of line wires to a pulling line, the combination of a yoke adapted for connection with a pulling line and having a mechanism associated therewith for attaching a plurality of line wires and for facilitating the transposition of the said wires, and means to prevent the twisting of the said wires, consisting of a weight attached to one side of said yoke.

7. In a device for attaching a plurality of line wires to a pulling line, the combination of a yoke adapted for connection with a pulling line and having a mechanism associated therewith for attaching a plurality of line wires and for facilitating the transposition of the said wires, a guide rope and means for attaching said guide rope to said yoke whereby the unintentional twisting of the said line wires may be prevented.

8. In a device for connecting a plurality of transmission wires to a pulling line, the combination of a yoke having a strut extending across two sides and near the apex of the said yoke, and means rotatably supported by said strut for connecting a plurality of line wires to said yoke, the sides of said yoke extending beyond the junction point with the said strut and in direction away from the said apex to protect the said connecting means from mechanical injury.

9. In a device for connecting a plurality of transmission wires to a pulling line, the combination of a yoke having a strut extending across two sides and near the apex of the said yoke, and means rotatably supported by said strut for connecting a plurality of line wires to said yoke, said means including a locking mechanism adapted to cooperate with said strut to hold said connecting means in definite position, the sides of the said yoke extending beyond the junction point with the said strut, and in direction away from the apex to protect the said connecting means from mechanical injury.

10. In a transposition device, the combination with a substantially V-shaped frame having a cross-member recessed within two sides of the frame, a phantom circuit transposing member rotatably supported by the said cross-member, and physical circuit transposing members rotatably supported by the said phantom circuit transposing member, the sides of the said V-shaped frame being of such proportions as to protect the transposing members against injury whenever the transposition device moves over any object in its path of travel.

11. In a transposition device, the combination with a yoke of a rotatable transposing member located within the extremities of the said yoke, and means for holding the said member in definitely fixed position therein, the said yoke being of such proportions as to effectively surround the transposing member, and to protect it against injury whenever the transposition device moves over any object in its path of travel.

12. In a transposition device, the combination with a yoke of a rotatable transposing member located within the extremities of the said yoke, means for holding the said member in definitely fixed position therein, and means for preventing the unintentional opening of the said holding means, the said yoke being of such proportions as to effectively surround the said transposing member and to protect it against injury whenever the transposition device moves over any object in its path of travel.

In testimony whereof, I have signed my name to this specification this 14th day of October 1919.

CHARLES H. KLEIN.